Nov. 13, 1956 L. A. GARDNER ET AL 2,770,670

CARRIER TELEGRAPH SWITCHBOARD SUPERVISORY SYSTEM

Filed May 9, 1952 6 Sheets-Sheet 1

INVENTORS L. A. GARDNER
J. L. HYSKO
BY John E. Cassidy
ATTORNEY

Nov. 13, 1956 L. A. GARDNER ET AL 2,770,670

CARRIER TELEGRAPH SWITCHBOARD SUPERVISORY SYSTEM

Filed May 9, 1952 6 Sheets-Sheet 2

INVENTORS L. A. GARDNER
J. L. HYSKO
BY John E. Cassidy
ATTORNEY

Nov. 13, 1956 L. A. GARDNER ET AL 2,770,670

CARRIER TELEGRAPH SWITCHBOARD SUPERVISORY SYSTEM

Filed May 9, 1952 6 Sheets-Sheet 3

INVENTORS L. A. GARDNER
J. L. HYSKO
BY John E. Cassidy
ATTORNEY

INVENTORS L. A. GARDNER
J. L. HYSKO
BY John E. Cassidy
ATTORNEY

INVENTORS L. A. GARDNER
J. L. HYSKO
BY John E. Cassidy
ATTORNEY

INVENTORS L. A. GARDNER
J. L. HYSKO
BY John E. Cassidy
ATTORNEY 2,770,670

CARRIER TELEGRAPH SWITCHBOARD SUPERVISORY SYSTEM

Leland A. Gardner and John L. Hysko, Summit, N. J., assignors to Bell Telephone Laboratories, Incorporated, New York, N. Y., a corporation of New York Application May 9, 1952, Serial No. 286,998

10 Claims. (Cl. 178—2)

This invention relates to a direct-current carrier-current manual telegraph switching system and more particularly to an arrangement wherein a carrier-current telegraph circuit is terminated at a teletypewriter switchboard and at a subscriber's station in direct-current terminations and in which transmission over the line between the switchboard and the subscriber station is on a carrier basis.

In the operation of modern teletypewriter switching systems, as is well understood in the art, in addition to the transmission of the permutation code combinations of signal conditions necessary for the defining of letters and other characters in the text of a message and necessary also for controlling the teletypewriter, that is to make the teletypewriter shift from lower to upper case, to introduce spaces between words, to return the carriage at the end of a line, etc., there are required to be transmitted and received other signals such as subscriber line calling, recall and disconnect signals whereby the subscriber may call the central station to have a connection established, summon the operator's attention after a connection is established for some required service and notify the operator that the connection may be taken down after communication is ended, respectively. In addition to these it is required to be able to send a break signal between teletypewriters connected to the ends of the connection. It is required also for an operator to be able to ring a station and in short it is necessary to transmit signals of several different kinds for several different purposes.

The modern teletypewriter has been designed, as is well understood, so that, in response to certain combinations of signals in accordance with a code, it types letter, number and other characters, and in response to other combinations of the same code, it performs the required shifting, spacing, carriage return and other control functions. This tends to lessen the problem of teletypewriter switching communication. However, in teletypewriter switching systems it is necessary to arrange the circuits so that they can discriminate between the teletypewriter communication and teletypewriter control signals on the one hand and the line calling, recall, disconnect, break and other supervisory signals on the other.

In telephone switching systems the problem is simpler than in teletypewriter switching systems in that the speech signals are essentially different from the line calling, recall and disconnect signals and discrimination between them is easier. Further no break signal is required in telephony. In modern teletypewriter switching systems the elements of the permutation code signals and of the break, line calling, recall and disconnect signals are in general essentially the same.

When it is considered that the subscriber line terminating circuit is by far the most numerous in the telephone or teletypewriter plant, in that one is required for each subscriber line, it should be obvious that it is important in the interest of economy that the number of apparatus components employed in each such circuit be kept to the minimum consistent with reliable operation, since this so importantly affects both the initial investment and the annual replacement and maintenance charges.

Modern manual telephone switching systems have evolved so that control of line calling, recall and disconnect signals is by means of the switchhook. That is to say, in a manual system the central telephone switching office is called simply by lifting the telephone receiver or handset from its hook or cradle, respectively. The operator is recalled by actuating the hook or the cradle plunger once after a connection is established. A disconnect signal is transmitted by restoring the receiver or handset to its hook or cradle.

The subscriber line terminating circuit in a teletypewriter switchboard, in meeting the requirements that it discriminate between signals, the elements of which are substantially similar, and that the number of apparatus elements be kept to a minimum, has been a continuing challenge to the communications engineer. In the earlier circuits a relatively large number of apparatus elements were employed and switchhook supervision was not possible. The modern circuits have fewer elements and do afford switchhook supervision. However, such control is limited to direct-current circuits, that is to say, to circuits in which the connection between a subscriber station and the manual teletypewriter switchboard is over a continuous direct-current path directly connecting the subscriber station to the switchboard.

The design of the subscriber line circuit in teletypewriter switchboard service has been complicated by the relatively few such switchboards and the remoteness of some of the subscriber stations. To connect the more remote teletypewriter subscriber stations to the switchboard by means of direct-current circuits, it has been necessary to introduce direct-current telegraph repeaters in the subscriber circuit at the station and at the switchboard. Some of the subscriber lines have several such repeaters so connected in tandem over line facilities.

The circuit interconnecting remote subscriber stations to teletypewriter switchboards may at times extend for as much as one hundred miles or more. Such circuits frequently make use of direct-current paths derived from the usual alternating-current telephone circuits interconnecting telephone central stations or repeater stations along the route to the location of the teletypewriter switchboard.

The derived circuit may be obtained, for instance, by methods well known in the art as simplexing and compositing. Recently, due to the greatly expanded demand for communication service of all kinds, there are fewer derived direct-current circuits available for telegraph or teletypewriter service. Recourse has been suggested in this situation to carrier-current transmission. Relatively narrow frequency bands are suitable for telegraph transmission and by a proper choice of frequencies additional channels may be made available on existing facilities. Certain carrier channels are being made available for this purpose at repeater stations along the route of the long subscriber lines. The lines will terminate in existing teletypewriter switchboards which have direct-current terminations. It is desirable, in the interest of economy and uniformity of operation, that these long subscriber carrier circuits be so terminated at the switchboard that connections be establishable with the present teletypewriter cord circuits thereat, which cord circuits are presently designed for direct-current operation. It is also desirable that switchhook supervision be afforded, if possible, for these carrier connections and that the number of apparatus elements be kept to a minimum.

One of the limitations encountered in the use of carrier as applied to telegraph communication between a subscriber station and a teletypewriter switchboard is that ordinarily the available basic signal conditions are limited to two, namely, the carrier-on condition and the carrier-off condition. It is difficult, if not impossible, to design a subscriber line terminating circuit for use at a teletypewriter switchboard which will afford switchhook supervision while meeting also the requirement that the number of apparatus elements in the line termination be few and relatively inexpensive while restricted by the further condition that a carrier circuit affording only two basic signaling conditions be introduced intermediate the subscriber station and the switchboard. Applicants have devised a system in which three rather than two conditions are afforded in a carrier-current circuit extending between a direct-current subscriber station circuit at a teletypewriter station and a direct-current subscriber line circuit at a teletypewriter switchboard. The three conditions are afforded by employing current pulses of a first carrier frequency for a first condition, of a second carrier frequency for a second condition and by employing no carrier as a third condition. The first carrier and second carrier are produced by shifting the tuning circuit of an oscillator. The difference in frequency between the first and the second carrier is relatively small so that the total required band width for the two carriers is relatively narrow. The terminations at the subscriber station and at teletypewriter switchboard are such that the apparatus elements required are relatively few. Further switchhook supervision is afforded and the subscriber line circuit terminations cooperate with the standard cord circuits in certain well-known manual switchboards without the necessity for modifying the cord circuits.

An object of the invention is the improvement of telegraph and teletypewriter switching systems.

A more particular object of the invention is the introduction of a carrier circuit between a direct-current subscriber teletypewriter station and a direct-current teletypewriter switching station.

While the invention herein is presently incorporated in a manual teletypewriter switchboard system, it is to be understood that it is applicable also to other telegraph and teletypewriter switching systems such as to mechanical telegraph and teletypewriter switching systems and to other manual switchboards and particularly to telegraph private line service, to telegraph concentrators and to telegraph service boards, to police and news networks and in general to all telegraph and teletypewriter service wherein remote stations are required to be connected over carrier facilities and, in addition to the communication signal elements forming the text proper and controlling the typed or printed message, supervisory signaling is required for control of the line, for establishing connections or disconnections or for other purposes.

The invention may be understood from the following when read with reference to the associated drawings disclosing a preferred embodiment of the invention in which:

Fig. 1 is a block and line diagram showing at the right the manner of interconnecting a subscriber teletypewriter, a subscriber station circuit, a ringer and rectifier, through a carrier circuit to a line extending toward the left to a teletypewriter central switching station where it extends through a carrier circuit, and a toll subscriber line circuit to a jack termination at the switchboard, and a cord circuit whereby it may be extended to other connections and indicates also arrangements whereby other carrier channels may be connected to the line;

Figure 1:
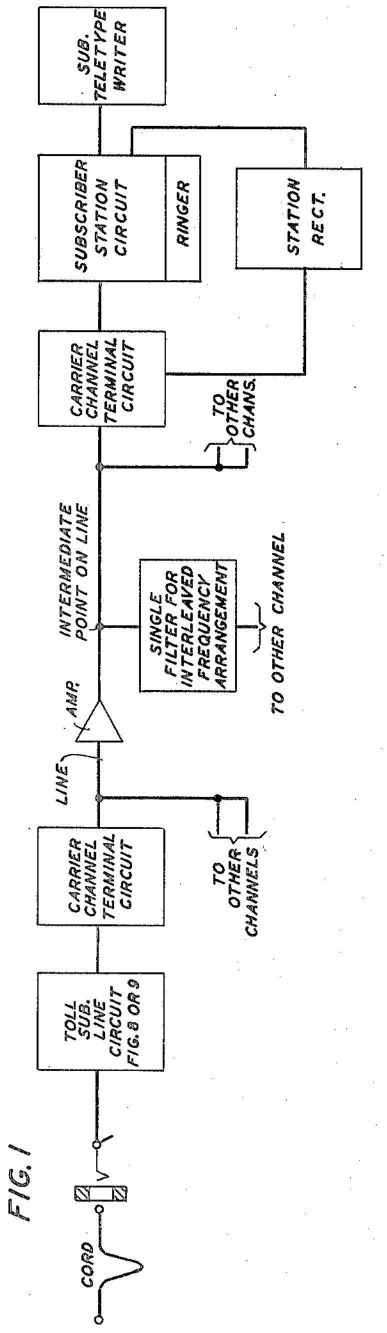

Refer now to Fig. 1. The left-hand portion of Fig. 1 shows by lines and captioned rectangles elements located at the teletypewriter switchboard. The right-hand portion shows by lines and captioned rectangles the elements located at a remote teletypewriter subscriber station.

Figure 8:
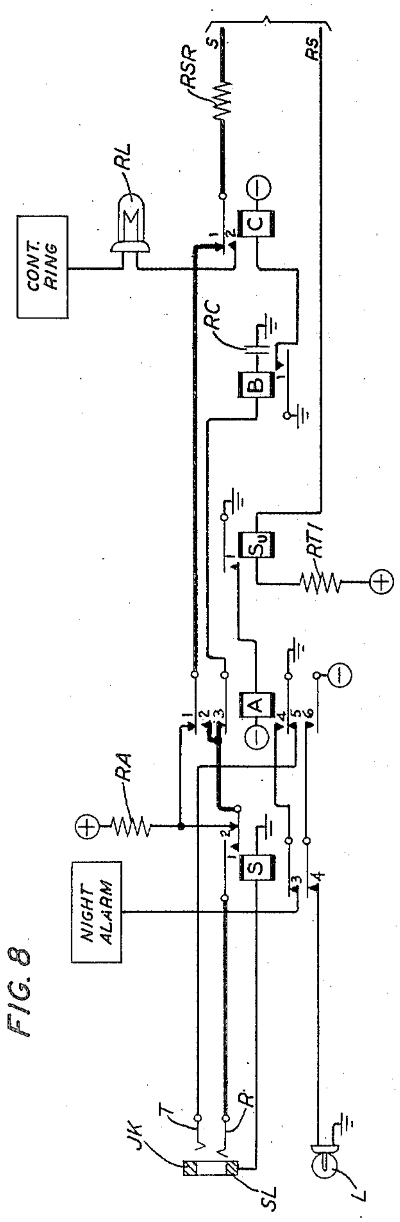
Fig. 8 shows the details of a toll subscriber line circuit and jack and lamp termination at a teletypewriter switchboard.
Figure 9:
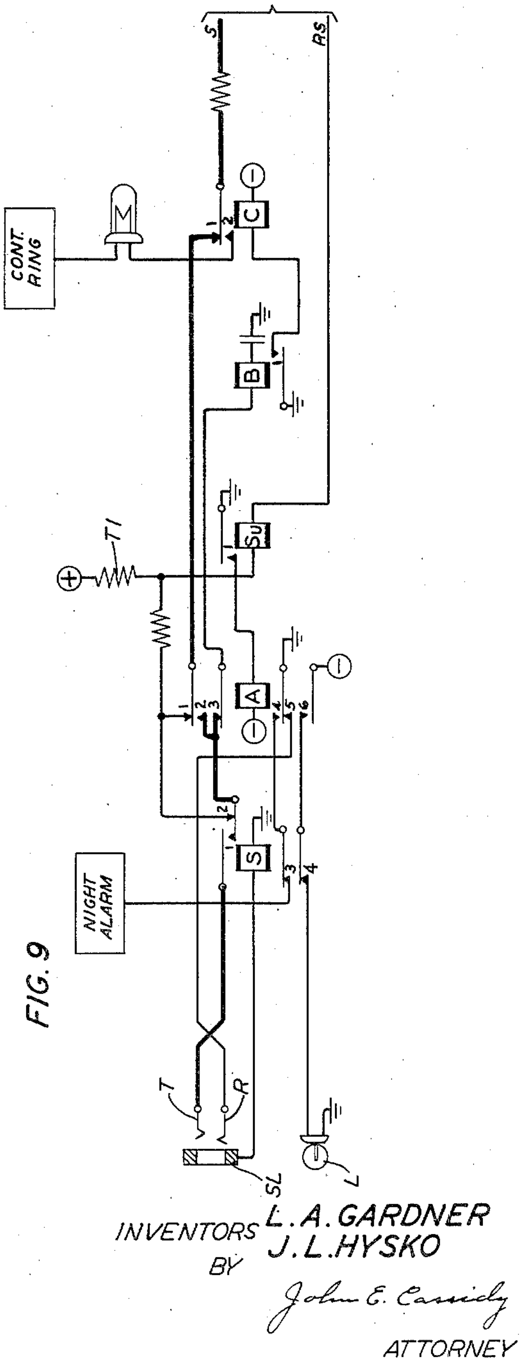
Fig. 9 shows a second embodiment of a toll subscriber line circuit and jack and lamp termination at a teletypewriter switchboard.

At the extreme left in Fig. 1 is indicated a teletypewriter cord circuit by means of which the circuits of the present invention may be interconnected to other circuits. The toll subscriber line circuit of the present invention may be incorporated in a number of different embodiments two of which are shown in Figs. 8 and 9 herein. The cord circuit which is employed will depend upon the particular toll subscriber line circuit embodiment which is employed. When Fig. 8 is employed the cord circuit per Fig. 3 of Patent 1,965,383, C. C. Lane, July 3, 1934 or Fig. 3 of Patent 2,222,672, W. V. K. Large, November 26, 1940 are employed. When Fig. 9 is used the cord circuit per Patent 2,360,040, C. A. Dahlbom, October 10, 1944 is employed. These patents are incorporated herein by reference as though fully set forth herein. To the right of the cord is shown a jack in which the circuits of the present invention terminate. There is at least one jack individual to each subscriber line. Normally, in addition to the one jack shown there will be a plurality of other jacks connected in multiple thereto so that one may be selected by any operator at each of a number of switchboard positions for completing connections to the particular subscriber station indicated in Fig. 1. To the right of the jack in Fig. 1 is a rectangle designated toll subscriber line circuit. This circuit is shown in detail in Fig. 8 and a second embodiment thereof in Fig. 9. The cord circuit is a direct-current circuit and the present toll subscriber line circuit is also a direct-current circuit which has been designed to cooperate with existing cords, while terminating a carrier telegraph circuit instead of a direct-current telegraph repeater subscriber line circuit so as to conform to present teletypewriter switchboard practice. To the right of the toll subscriber line circuit is a carrier channel terminal circuit. It is to be understood that a plurality of terminations such as that shown at the left in Fig. 1 may be connected to the single line. These are indicated by multiple connections shown extending toward the left to a bracket designated "To Other Channels." The plurality of equipments for all of the individual channels at the left is connected to a single line which extends toward the right to a point remote from the teletypewriter switchboard. The distance as mentioned heretofore may be for instance one hundred miles or more. At a distant point to the right the line is formed into a number of branches, as at the left, to separate the various channels. The particular channel with which we are presently concerned extends through a carrier circuit and a subscriber station circuit and ringer to a subscriber teletypewriter. A rectifier is generally employed at the station as indicated to supply direct-current voltage to the circuits thereat as required. It is to be understood that connections to other channels may extend from any intermediate point on the line. One such channel is so indicated in Fig. 1.

Figures 2, 4:
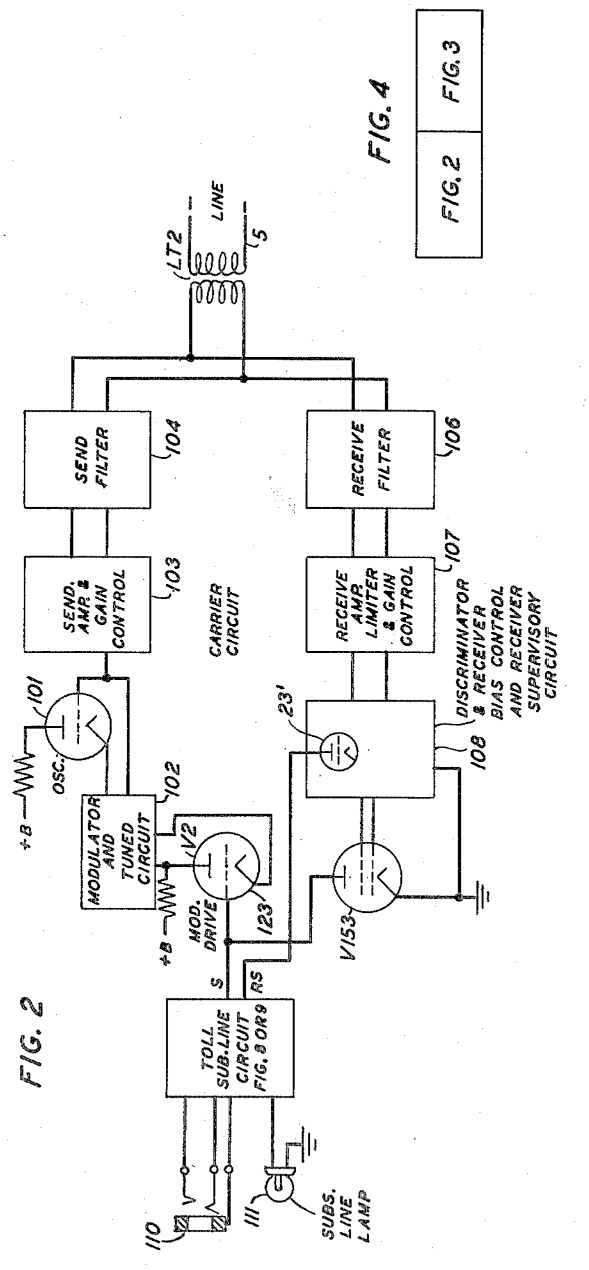
Fig. 2 is a block and line diagram showing at the right the manner of connecting the line at the teletypewriter central switching station through the sending and receiving branches of a carrier circuit arranged for carrier shift, and extending at the left through the toll subscriber line circuit to the jack termination in the toll subscriber line circuit.
Fig. 4 is a diagram showing the manner in which Figs. 2 and 3 should be disposed for interconnection.
Figure 3:
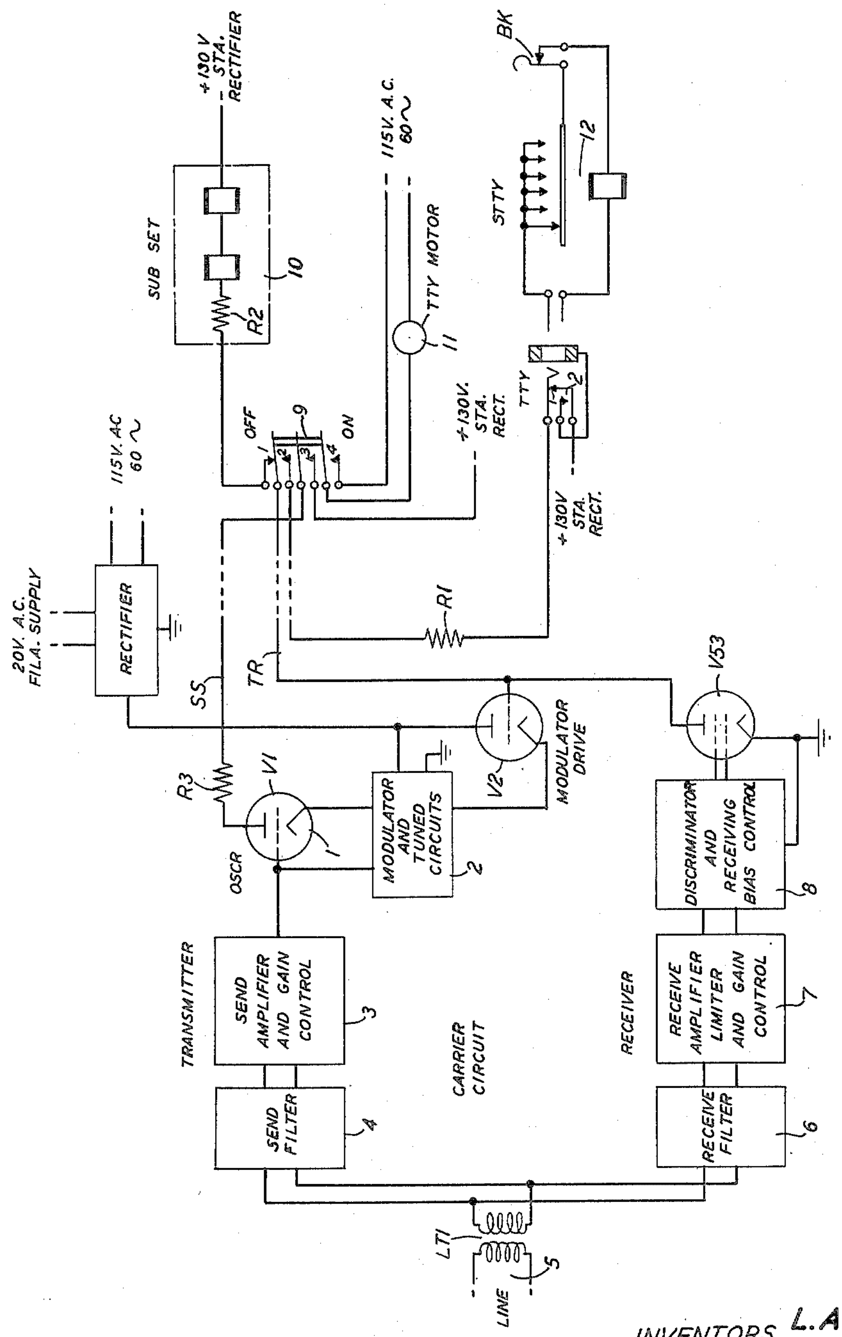
Fig. 3 shows a direct-current teletypewriter subscriber station connected through a carrier circuit arranged for carrier frequency shift to a line, the carrier portion of the circuit being indicated by captioned rectangles.

Refer now to Figs. 2 and 3, disposed as in Fig. 4, which show the arrangement of Fig. 1 largely by means of captioned rectangles but in more detail than in Fig. 1.

In Fig. 2 at the left is shown the jack and lamp termination at the teletypewriter switchboard connected through the toll subscriber line circuit, the carrier circuit and a transformer to the line. The line extends to the right into Fig. 3 where it extends through a transformer and the carrier circuit to the subscriber station circuit and the subscriber teletypewriter.

The carrier circuits at the teletypewriter switchboard and at the remote subscriber station are substantially identical. Each carrier circuit has two branches, a transmitting branch shown in the upper portion and a receiving branch shown in the lower portion of each figure.

In transmitting from the teletypewriter switchboard toward the subscriber station after passing through the toll subscriber line circuit the signals are impressed on the modulator drive tube 123 which, together with the modulator, switches the tuning of the tuned circuits 102, controlling the frequency produced in the oscillator tube 101. In response to a first signaling condition transmitted from the switchboard, an alternating current of a first frequency F1, called the first carrier, is generated in the oscillator circuit. In response to a second signaling condition from the switchboard an alternating current of a second frequency F2, called the second carrier, is produced. These two carriers differing in frequency serve as the signal elements which are transmitted over the line. Heretofore, in teletypewriter switchboard operation the signal elements transmitted over the line to the subscriber station have been direct-current signal elements. Heretofore, generally when carrier current signals have been employed in telegraph systems the two basic telegraph signaling conditions have been produced by generating an alternating current of a single frequency for the first telegraph signaling condition and by reducing its amplitude to zero rather than changing its frequency for the second signaling condition. In the present arrangement, as will be made clear hereinafter, a third condition, namely, the absence of carrier is employed as a third signaling condition. Further, a fourth signaling condition, namely, transitions between F1 and F2 at a predetermined frequency, for instance 20 cycles, is employed. These four signaling conditions are available for any purpose. In the arrangement herein F1 is employed as a marking signal element. F2 is employed as a spacing signal element. The no-carrier condition is employed for supervision. Transitions between F1 and F2 at a predetermined frequency, such as 20 cycles, is employed for ringing the station. It is to be understood, however, that each of these four conditions may be assigned for any of the functions, if desired, by adapting the circuits as required for the purpose. Further, it is obviously possible to alternate between F1 and F2 at a first predetermined frequency for ringing, for instance, and at a second predetermined frequency or at a plurality of predetermined frequencies for other supervisory or signaling purposes.

To return now to the description of Figs. 2 and 3, the signals are transmitted through the send amplifier and gain control 103, the send filter 104, the transformer LT2, the line 5 into Fig. 3 where they pass through the transformer LT1, the receive filter 6, the receive amplifier, limiter and gain control 7, the discriminator and receiving bias control 8 and the tetrode V53 to the conductor TR to the subscriber station circuit.

The subscriber station circuit, the ringer and the subscriber teletypewriter thereat are shown in detail. The subscriber station equipment may be arranged for attended or unattended service. The arrangement shown in Fig. 3 is for attended service. In this arrangement when the circuit is idle, as shown, a circuit may be traced from the grounded cathode of tetrode V53, through the tube to its anode to the conductor TR which is connected through contact 1 of key 9 to the subset or ringer 10 where it extends through resistor R2 and the windings in series of two ringer magnets to positive battery, which may be, for instance, +130 volts.

When the subscriber station is to be called from the switchboard, ringing current of 20 cycles, for instance, is applied at the switchboard in a manner to be described. This is translated in the carrier circuit per Fig. 2 into F1 and F2 transitions at 20 cycles and responsively into the activation and inactivation of tetrode V53 in the carrier circuit per Fig. 3 at 20 cycles. Current no-current pulses at 20 cycles will pass through the ringer magnets in the subset 10, under control of the tetrode V53 in Fig. 3 to operate the ringer in a well-known manner.

When the subscriber station is in the idle condition as shown a circuit may be traced from ground in the modulator and tuned circuits 2 through the cathode-anode path of oscillator V1, resistor R3, and conductor SS to contact 3 of key 9 which is open for idle condition of the subscriber station. During the idle condition, therefore, no oscillations will be produced in the oscillator circuit per Fig. 3 and no signals will be transmitted through the send amplifier and gain control 3, and the send filter 4 through transformer LT1 to the line 5. This effects the third or no-carrier signaling condition. It will be made apparent hereinafter that supervision at the switchboard can be controlled by means of the third or no-carrier condition.

After the subscriber station has been turned over to the customer for service the subscriber teletypewriter STTY is connected at all times to the teletypewriter jack TTY. The teletypewriter motor which drives the teletypewriter is not energized since it energizing circuit, which may, for instance, be 115-volt alternating current, is open at contact 4 of key 9.

In response to the ringing of the station the attendant actuates key 9 to its lower position closing contact 4 and energizing the teletypewriter motor. When key 9 is actuated to its lower position contact 1 is opened disconnecting the subset or ringer 10. Contact 3 is closed which connects positive battery such as +130 volts through resistor R3 to the oscillator V1. Contact 2 is closed which connects lead TR through resistor R1 and contact 1 of jack TTY to positive battery via the subscriber teletypewriter circuit STTY when connected to the TTY jack. With the teletypewriter cord connected to the TTY jack contact 1 is opened, contact 2 is closed and a circuit from positive battery through TTY jack contact 2 is established, sleeve of the jack, sleeve of the plug, winding of the hold magnet, contacts of break key BK, teletypewriter transmitter contacts, tip of the plug, and the tip of the TTY jack from which point the path has been traced through resistor R1, contact 2 of key 9 and conductor TR to the anode of tetrode V53 the cathode of which is grounded. The anode of tetrode V53 and the grid of modulator drive triode V2 are connected in parallel.

After the operation of Key 9, permutation code signal combinations, comprised of signal elements F1 and F2, defining letter, number and other teletypewriter characters and other combinations which control the teletypewriter in performing functions such as spacing, line feed carriage return, etc., may be transmitted from the switchboard and impressed on the selector magnet of the teletypewriter which will responsively type the character or perform the function.

In transmitting from the subscriber station toward the switchboard the station attendant will operate the teletypewriter keys to actuate the teletypewriter transmitting sending contacts. As the contacts are actuated the path through the teletypewriter will be opened and closed. During the closed interval current will flow through the teletypewriter and the anode-cathode path of tetrode V53. During the contact open periods no current will flow. The potential impressed on the input of the modulator drive tube V2 will responsively change so that triode V2 conducts for the closed or marking condition and is cut off for the open or spacing condition. Impedance units in the tuned circuits 2 will be responsively switched to produce alternating currents of frequency F1 and F2 which are transmitted through elements 3, 4 and LT1 of Fig. 3 over line 5 to the distant teletypewriter station, through elements LT2, and into the receiving branch of the carrier circuit of Fig. 2, where it passes through the receive filter 106, the receive amplifier limiter and gain control 107, the discriminator and receive bias control 108, through tetrode V153 and finally through the toll subscriber line circuit to the jack 110 from which point the connection is extended through a cord to other lines. Supervisory signals are transmitted from the subscriber station under control of key 9 which, as has been explained produces the no-carrier condition when in its upper position and marking carrier F1 when in its lower position. These signals pass through a triode V2 of the discriminator and receive bias control 108 and are impressed through conductor RS on the toll subscriber line circuit to control the line lamp 111 or to impress conditions through the contacts of jack 110 to operate supervisory signal controls such as recall and disconnect signal controls in the connected cord. All of the foregoing will be explained in greater detail hereinafter.

Before proceeding with a description of the operation of the toll subscriber line circuit, first the manner in which the carrier circuit portion of the system operates will be described in detail.

Figures 5, 7:
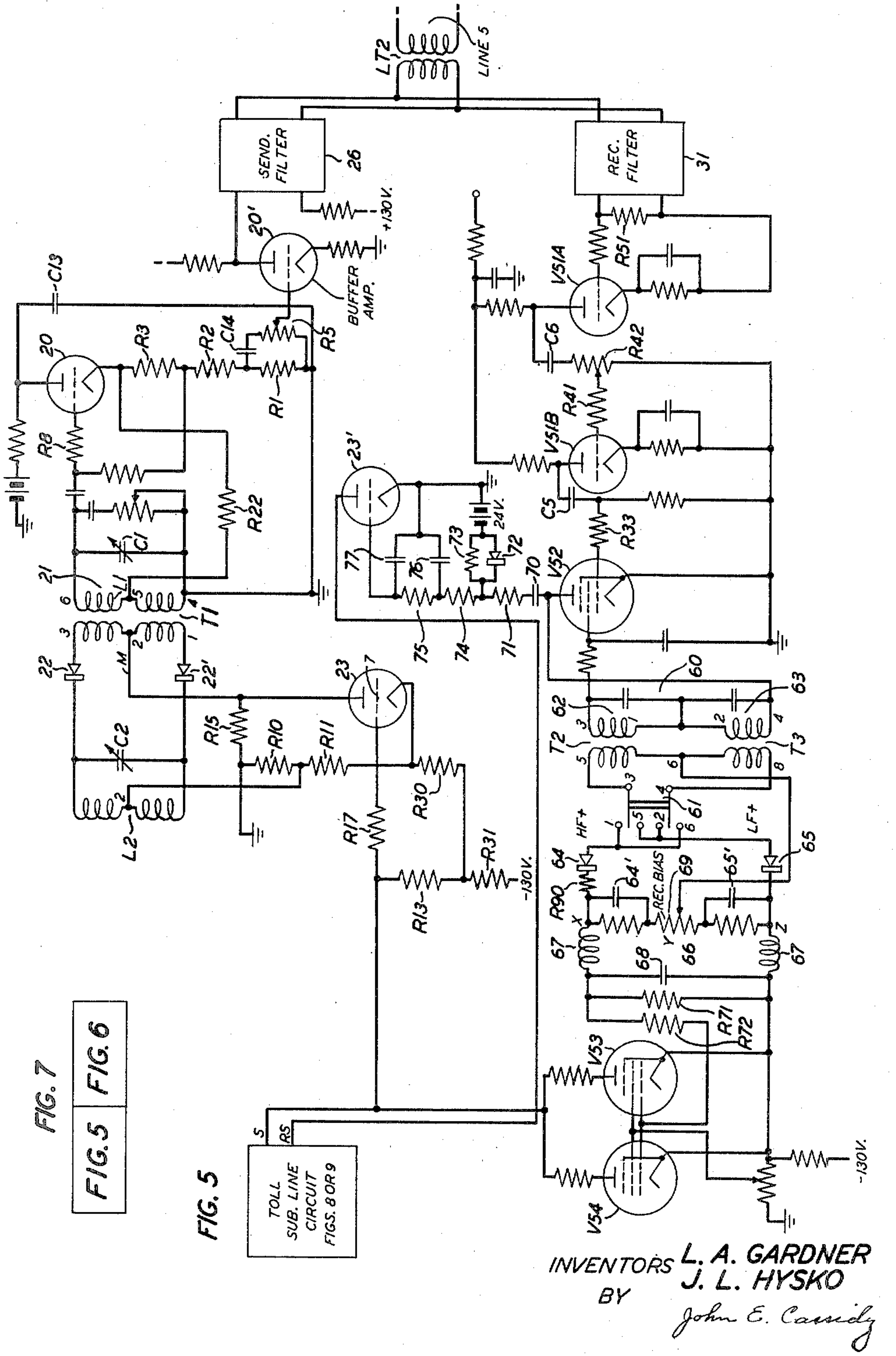
Fig. 5 shows the details of the carrier portion of the circuit connected to the toll subscriber line circuit at the teletypewriter switchboard, the toll subscriber line circuit being indicated by a captioned rectangle.
Fig. 7 is a diagram showing the manner in which Figs. 5 and 6 should be disposed for interconnection.
Figure 6:
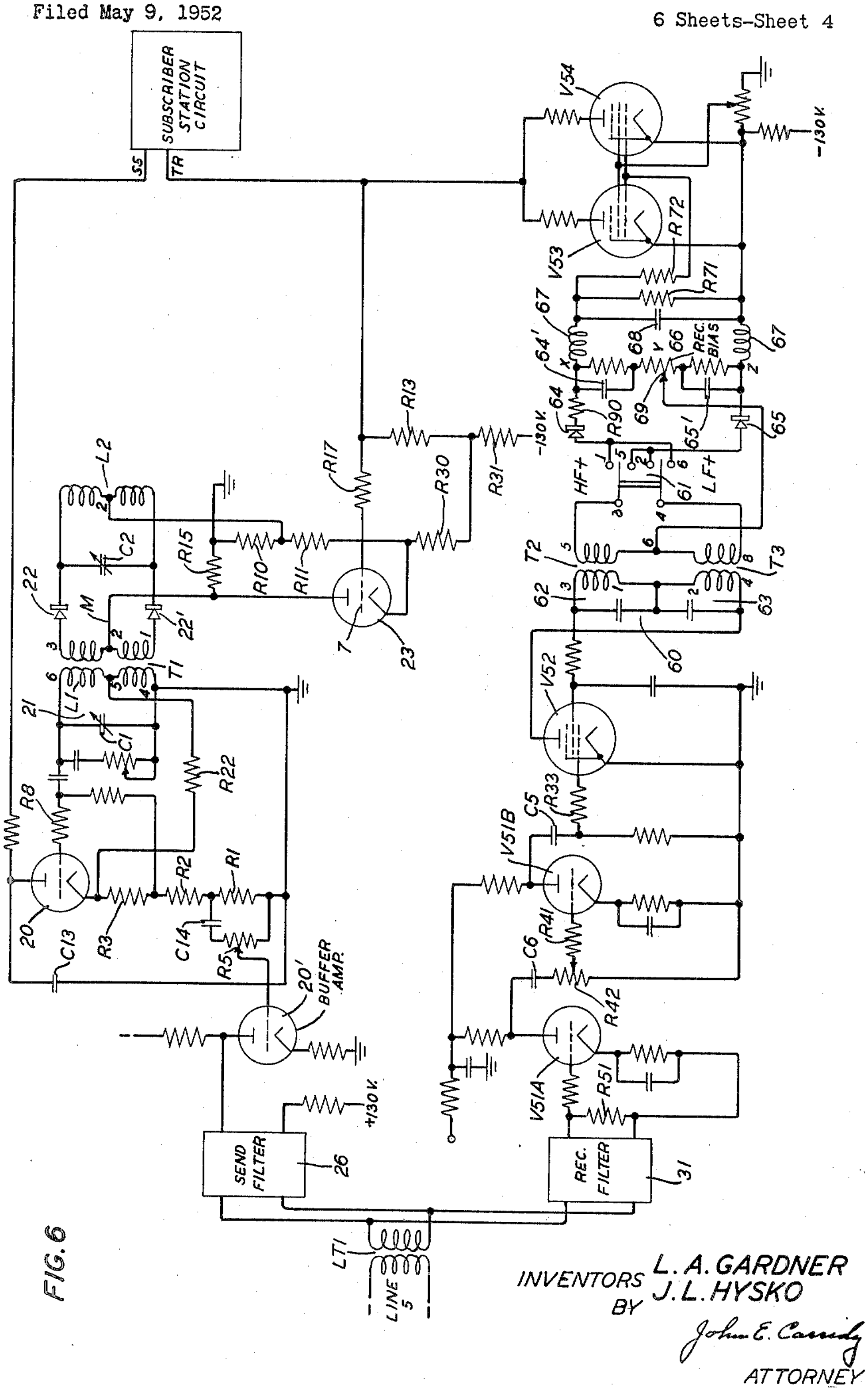
Fig. 6 shows the details of the carrier portion of the circuit connected to the subscriber station circuit at the teletypewriter station, the subscriber station circuit being indicated by a captioned rectangle.

Refer now to Figs. 5 and 6 disposed as in Fig. 7. In Fig. 5 the toll subscriber line circuit indicated by a rectangle at the left is connected through the sending and receiving branches of the carrier circuit shown at the top and bottom of Fig. 5 respectively, through transformer LT2, line 5, into Fig. 6, through transformer LT1 and through the sending and receiving branches of the carrier circuit at the subscriber station to the subscriber station circuit indicated by a rectangle at the right of Fig. 5.

Refer now to Fig. 5. The carrier telegraph transmitter comprises an oscillator 20 having a tuned circuit 21 in its feedback path. The tuned circuit 21 is tunable to two discrete frequencies F1 and F2, termed the normal and shifted frequency, respectively. The oscillator 20 generates the normal frequency F1 determined by variable capacitor C1 and the primary coil L1 of transformer T1 which frequency represents the marking condition. For spacing, the frequency of the oscillator is shifted to F2 by the coupling of additional reactance L2—C2 into the tuned circuit. The switching of the added reactance is under the control of the varistors 22, 22′, whose impedance, high or low, is determined by a bias direct-current voltage on lead M.

The oscillator tube 20 which may be half of a twin triode vacuum tube, furnishes the necessary feedback gain to maintain oscillations. The other half of the twin triode, namely tube 20′, constitutes a buffer amplifier between the oscillator 20 and the line 5. The output from the oscillator tube 20 supplies feedback to its frequency determining tuned circuits 21 through resistor R22 and winding 5—4 of input transformer T1. Resistor R8 serves to suppress parasitic oscillations.

The oscillating voltage which appears between winding 6—5 of transformer T1 is applied between the grid and cathode of tube 20 causing a current of the same frequency to circulate through the cathode-plate circuit of this tube, which includes condenser C13 and a group of resistances R1, R2 and R3 in series with the cathode. The drop in the group of resistances R1, R2 and R3 is applied to windings 4—5 of transformer T1 which furnishes the necessary coupling between the cathode and grid to sustain oscillations. The grid of tube 20 is suitably biased by the direct-current component of the cathode current through resistor R3.

For the marking condition, the varistors 22 and 22′ are non-conducting or biased to provide a very high impedance, thereby rendering the secondary of transformer T1 ineffective and isolating the additional reactance L2—C2, so that the tuned circuit resonates at the marking frequency $$F1=\frac{1}{2\pi\sqrt{L_1C_1}}$$

For the spacing condition, the varistors conduct and the oscillator frequency is shifted to the spacing frequency F2 by the coupling of added reactance L2—C2 in parallel into the tuned primary of transformer T1.

The switching of the additional reactance into the tuned circuit 21 is accomplished by biasing varistors 22 and 22′ to a low impedance value by means of the appropriate direct-current bias. If the net added reactance is capacitive the frequency is shifted to a lower value. If inductive, the frequency is shifted to a higher value.

The varistors 22 and 22′ function as series switches under the control of modulator tube 23 which may be half of a twin triode vacuum tube the other half of which may be triode 23′. The grid of tube 23 is driven by the signals originated in the toll subscriber line circuit in a manner to be described hereinafter. Modulator tube 23 is thus caused to conduct for an outgoing marking signal and to cut off for an outgoing spacing signal.

When modulator tube 23 is conducting, resistor R15 and the plate to cathode path of tube 23 connected in series are shunted by resistors R10 and R11. This condition produces a potential at the plate of tube 23 which is negative with respect to the potential at the junction of resistors R10 and R11. This negative potential is impressed between terminal 2 of transformer T1 and terminal 2 of inductance coil L2 and is thus impressed across varistors 22 and 22′ in the non-conducting direction.

For the spacing condition, the tube 23 is cut off and a current flows from negative 130-volt battery through resistor R31, resistor R30, resistor R11, terminal 2 of inductance coil L2 through the top and bottom windings of inductance coil L2 in parallel, varistors 22 and 22′ in parallel, windings 1—2 and windings 2—3 of transformer T1 in parallel, conductor M and resistor R15 to ground. The path from the top terminal of resistor R11 to ground, as just traced, is shunted by resistor R10. Varistors 22 and 22′ are in the low impedance condition for this condition. As a result of this the secondary of input transformer T1 is effectively coupled to the reactance of inductance coil L2 and capacitor C2. This changes the tuning of the oscillator circuit which responsively generates alternating current at frequency F2. Since the voltage and current for controlling the impedance of the varistor units is fed into center taps 2, 2 of the input transformer secondary and of the inductance coil L2, respectively, no disturbing transients are coupled into the oscillator tuned circuit.

The marking frequency F1 and the spacing frequency F2 from the oscillator are passed into the capacitor C14 and through the variable resistor R5 into the buffer amplifier 20′, thence through sending filter 26 and transformer LT2 over line 5 to the distant subscriber station. The sending filter 26 is tuned to the mid-frequency of a frequency band between F1 and F2.

Thus, signals are formed by shifting the carrier oscillator frequency between values F1 and F2 which are equal amounts above and below the nominal mid-band of the sending and receiving filters.

Refer now to Fig. 6. The received signals pass through transformer LT1 of Fig. 6 and are selected by an appropriate receiving filter 31 which accepts a narrow band of frequency centered about the marking and spacing frequencies F1 and F2 of the channel to be received. Like the sending filter of Fig. 5 the receiving filter 31 of Fig. 6 provides an impedance transforming structure presenting 600 ohms toward the line and approximately 140,000 ohms toward the grid cathode circuit of the first amplifier stage V51A. Tubes V51A, V51B and V52 form an amplifier limiter so that the output of tube V52 remains constant for wide variations of received level. When the received level is low tube V52 does all of the limiting. The 1-megohn resistor R33 in series with its grid prevents the grid from going positive and so confines swings in plate current to the range from 0 to about 10 milliamperes. The output therefore is substantially constant for any signal level at the input of the received filter 31 exceeding about minus 50 decibels with respect to one milliwatt. When this level is so high that grid current tends to flow in tubes V51A and V51B, these tubes also contribute to the limiting action due to the resistance in the grid circuits. Large carrier amplitudes are limited by tube V51A and small amplitudes are limited by tube V51B and/or tube V52.

The resistor R42 constitutes a gain control which is connected between the plate of tube V51A and the grid of tube 51B. It provides the means for adjusting the gain of the limiter-amplifier aforementioned. The series grid resistor R41 serves to limit the positive grid swing for large signals and minimizes the amount of self-bias developed across coupling capacitor C6. This arrangement gives substantially symmetrical limiting of the carrier frequency wave form.

The output from the plate of tube V51B is coupled to the grid of pentode tube V52. The series grid resistor R33 limits the positive grid swing and minimizes the amount of self-bias across couppling capacitor C5 due to grid rectification.

The plate current of tube V52 passes through the primary side of the discriminator circuit 60. The discriminator consists of two anti-resonant circuits 62 and 63 in series which are tuned respectively to somewhat higher and lower frequencies than F1 and F2, the mark and space frequencies, respectively. The coils of the two tuned circuits 62 and 63 are the primaries of the two independent one-to-one ratio transformers T2 and T3, one primary being tuned to parallel resonance at the high frequency edge of the channel band, and the other being tuned to parallel resonance at the low frequency edge of the channel band. The secondary windings of transformers T2 and T3 are connected in series. Reversing switch 61 provides means for reversing the output connections from the discriminator network.

When the discriminator switch is operated to the HF+ position, the higher frequency is rectified by rectifier 64 and the lower by rectifier 65, resulting in direct-current voltages appearing across points XY and YZ, respectively. These voltages are poled oppositely and their algebraic sum is applied between the grids and cathodes of tubes V53 and V54 which are connected in parallel. It follows that when the higher frequency is received, voltage XY predominates and the grids of these tubes are positive with respect to their cathodes, and when voltage ZY is the larger they are negative. Condensers 64′ and 65′, respectively, form a by-pass for the carrier currents.

The function of the limiter is apparent, for since the discriminator would translate either changes in frequency or changes in magnitude appearing at its input into corresponding voltage variations across terminal XY and terminal YZ, it is necessary that magnitude changes be first eliminated by the limiting action of the preceding vacuum tube stages. With the arrangement employed, tube V52 generates a plate-to-cathode alternating-current voltage which is independent of signal magnitude or frequency, but this voltage, or the greater part of it, is alternately shifted between the input terminals 3—1 and 2—4 of the discriminator transformer, depending on whether a marking or spacing frequency is received. Fundamentally, the limiting action is secured by producing an amount of amplification in tubes V51A and V51B which is far in excess of that required to obtain the needed voltage across terminal XY and terminal YZ and then severely curbing the magnitude of their outputs. Due to this action, variations in level change affect equally the marking and spacing frequencies and cause no signal distortion. In other words, frequency-shift operation gives extremely effective level compensation.

The rectified signals are passed through the low-pass filter 66 consisting of inductance coils 67 and condenser 68. The low-pass filter has a cut-off frequency near 40 cycles and serves to remove carrier ripple and to attenuate interference arising from extraneous frequency components differing from the carrier frequency by more than 40 cycles. A balanced low-pass filter structure without mutual inductance is used in order to present high and nearly equal impedances to ground. This prevents a change in the tuning of the discriminator when reversing switch 61 is operated for reversing connections from the discriminator. A positive or negative output may thereby be obtained by the marking condition. The discriminator switch 61 also permits normal operation with a reversal of the mark and space frequency assignments if desired.

The output of the low-pass filter is terminated by resistor R71 and is applied through grid limiting resistor R72 to the grids of output tubes V53 and V54. In order to center the demodulated signals on the grid characteristic of tubes V53 and V54 and thus avoid biased signals, the mean of the mark and space output voltages from the low-pass filter must be a few volts negative with respect to the cathodes of tubes V53 and V54. This is accomplished by adjustment of the potentiometer 69, by which the positive output condition may be made to be of less amplitude than the negative output condition. The potentiometer 69 also provides means for compensating for discrepancies in the discriminator and deviations in the marking and spacing frequencies from their theoretical values, also for other biases which may originate in the sending terminal.

Tubes V53 and V54 therefore act in unison as a single switch whose closing is controlled by positive signals across terminals XZ and whose opening is effected by negative signals across the same points, that is, they are equivalent to a receiving relay operated by polar signals.

When signals are received this "switch" closes the circuit through the TR lead into the subscriber station circuit permitting current from +130-volt battery, for instance, to flow through the connected circuit to the anodes of tubes V53 and V54 and through the tubes to their grounded cathodes as a marking signal. When the "switch" opens under the influence of a negative voltage this current is broken and a spacing signal is produced in the connected circuit. This will be understood from a description of the toll subscriber line circuit hereinafter.

Attention is particularly called to the fact that the grids of tubes V53 and V54, Fig. 6, are connected through resistor R71 to the cathodes of these tubes. Hence when no carrier is being received from the distant switchboard, since the grids and cathodes of these tubes are at the same potential and since lead TR is terminated in positive battery in the connected subscriber station circuit, current will flow through the anode-cathode circuits of the tubes to hold the connected circuit in the marking condition. This is known as the mark-hold feature. Reference to Fig. 5 shows that the arrangement of tubes V53 and V54 at the teletypewriter switchboard is the same as at the opposite terminal connected to the subscriber station. In this case when no carrier is being received at the subscriber station, current will flow from positive 130-volt battery connected to lead S in the connected circuit through the anode-cathode of the tube to ground holding the connected circuit in the marking condition.

When the higher channel frequency is employed for spacing instead of marking, the left-hand part of the oscillating circuit 20 is made inductive instead of capacitive and the discriminator switch 61 is operated to LF+. This impresses the lower frequency through rectifier 64 and the resulting rectified voltage appears between points XY.

When signals are being transmitted from the switchboard, the subscriber station, Fig. 6, is normally transmitting a steady marking signal so that the grids of tubes V53 and V54 are kept continually positive. These tubes will therefore conduct when a marking signal is transmitted from the switchboard by closing the circuit through conductor S, and will be non-conducting when a space is transmitted by opening the path through conductor S. During the mark grid 7 of tube 23 in Fig. 5 is positive with respect to its cathode, causing tube 23 in Fig. 5 to become conducting and to send out a marking signal over the carrier line to the distant subscriber station. During a spacing signal the voltage at grid 7 of tube 23, Fig. 5, which is connected to −130 volts through resistor R13, falls to −130 volts, tube 23 becomes non-conducting and spacing carrier is transmitted as previously described.

When mark and space signals are being received from the distant subscriber station the path through conductor S is normally in the closed condition. During the reception of a marking signal from the distant subscriber's station a positive voltage is applied to the grids of tubes V53 and V54, these tubes conduct and current flows in conductor S. This results in a voltage, applied to the grid of tube 23, which is positive with respect to the cathode of tube 23 and marking carrier is transmitted over the carrier line as described above to the distant subscriber station. When a spacing carrier signal is received by Fig. 5 from the distant subscriber station, a negative voltage is applied to the grids of tubes V53 and V54. This reduces the current in conductor S to nearly zero. The potential at the plates of tubes V53 and V54 rises to +130 volts for this condition due to the battery at the end of conductor S. Thus the voltage applied to the grids of tube 23, Fig. 5, becomes even more positive and tube 23 remains conducting so that an outgoing marking condition is sustained. In summation, therefore, tube 23 of Fig. 5 cuts off for a spacing signal from the switchboard through conductor S, conducts for a marking signal from the switchboard through conductor S, and remains conducting when a marking signal is received from the subscriber's station as well as when a spacing signal is received from the subscriber's station.

The resistor R13 shown in Fig. 5 is effective in transmitting a break signal from the switchboard to the distant subscriber's station. When conductor S is open to transmit a break signal from the switchboard to the distant subscriber station, resistor 13 acts to insure that a spacing potential is applied to grid 7 of modulator tube 23 in Fig. 5 during intervals when a spacing signal is being received from the subscriber's station and tubes V53 and V54 are responsively cut off.

It has been mentioned in the foregoing that normally battery is disconnected from the plate of oscillator tube at the subscriber's station when the station is idle and key 9 at the station is in its upper position. It has been explained also that during this interval no carrier is transmitted from the subscriber station over the line to the teletypewriter switchboard. It has been explained that when key 9 is actuated to its lower position battery is connected to the anode of the oscillator tube and marking carrier F1 is transmitted to the teletypewriter switchboard. Key 9 is actuated in order to operate the subscriber's line lamp at the teletypewriter switchboard. The manner in which the receiving branch of the carrier circuit in Fig. 5 functions to impose a condition on conductor RS so as to actuate the toll subscriber line circuit to light the lamp will now be described. The manner in which the toll subscriber line circuit cooperates in performing this function will be described hereinafter.

In response to the transmission of marking carrier F1 upon the actuation of key 9 at the subscriber station, the carrier signal will be passed by receiving filter 31, tubes V51A and V51B and imposed on the input of tube V52 resulting in an alternating-current flow from the plate of tube V52 through blocking condenser 70, resistor 71 and the parallel combination of resistor 73 and varistor 72 to the negative terminal of the filament battery thence to ground and finally back to the cathode of tube V52. The rectifying action of varistor 72 sets up a direct-current voltage across resistor 73 which opposes the negative 24-volt bias on the grid of tube 23′. The low-pass R-C filter comprising resistor 75 and capacitances 76 and 77 shown in the grid circuit of tube 23′ removes the carrier and provides a delay in the build-up of the direct-current grid voltage on tube 23′. Grid current flow in tube 23′ limits the voltage between grid and cathode to zero. When the rectified voltage across resistor 73 is equal to or greater than the −24 volt bias, tube 23′ conducts, since conductor RS is terminated in positive 130-volt battery in the toll subscriber line circuit. As will be made apparent hereinafter, conductor RS extends through the winding of a supervisory relay in the toll subscriber line circuit which controls the line lamp and performs other supervisory functions. When the carrier for the supervisory signal is applied to the input of receiving filter 31 at normal level, plate current does not flow for about 150 milliseconds, but when the carrier input stops, the current flowing in the output circuit of tube 23 through conductor RS falls to zero in about 50 milliseconds. The longer delay insures against false operation of the supervisory relay due to bursts of noise, while the shorter delay provides a relatively fast disconnect signal when the distant subscriber opens his power switch.

The details of the operation of the toll subscriber line circuit per Fig. 8 will now be described. It will be recalled that in describing Figs. 1, 2 and 5, it was explained that the carrier circuit is interconnected to the switchboard through a toll subscriber line circuit of which there are described herein two different embodiments per Figs. 8 and 9. First, the arrangement per Fig. 8 will be described.

Refer now to Fig. 8 and Fig. 5. The toll subscriber line circuit shown at the left in Fig. 5 is connected into the carrier circuit through conductors S and RS. Conductor S is the conductor over which teletypewriter signals are transmitted and received. Conductor RS is the conductor over which supervisory signals are received from the distant subscriber station. Reference to Fig. 5 discloses that conductor S is connected to the grid 7 of modulator tube 23 which controls the transmission of teletypewriter signals to the distant subscriber station. Conductor S is connected also in multiple to the anodes of tubes V53 and V54 by means of which teletypewriter communication signals are received from the distant subscriber station. In the description of Fig. 5 in the foregoing it was explained that supervisory signals incoming from the distant subscriber station are impressed through triode 23′ on conductor RS which is connected to the anode of triode 23′.

Refer now to Fig. 8. Conductors S and RS are shown extending into the toll subscriber line circuit per Fig. 8 from the right-hand margin of Fig. 8. During the idle condition the transmission lead S from the carrier channel terminal is connected through resistor RSR, back contact 1 of relay C, back contact 1 of relay A and resistor RA to positive telegraph battery which may be, for instance, 48 volts. Current which may be, for instance, 20 milliamperes will flow in lead S and the carrier channel terminal will send out marking current to the line over the transmitting branch of the carrier circuit to the distant subscriber station. No current will flow in the supervisory conductor RS and no relays in the circuit, per Fig. 8, will be operated.

It will be assumed now that the subscriber at the distant subscriber station calls in by operating the power switch 9 at the subscriber station. As a result of this carrier current will be received through the receiving branch of the carrier circuit per Fig. 5. It has been explained heretofore that as a result of this triode 23′ becomes conducting. Current will, therefore, flow from positive telegraph battery which may be, for instance, 130 volts, in Fig. 8, through resistor RT1 and the winding of supervisory relay SU over the RS lead to the anode of triode 23′ and to its cathode to ground operating relay SU. This current should be approximately 10 to 15 milliamperes but its value is not critical. The operation of relay SU establishes a circuit from ground through contact 1 of relay SU and the winding of relay A to battery operating relay A. The operation of relay A will perform five functions as follows:

1. It transfers conductor S from contact 1 of relay A to contact 2 of relay A. Positive battery will, however, continue to be supplied to conductor S over a path through resistor RA, contact 2 of relay S and contact 2 of relay A so that positive battery will remain connected to the conductor as in the idle condition.

2. The operation of relay A will disconnect the winding of relay B from a path which is connectable to the ring conductor R of the jack JK by opening contact 3 of relay A.

3. The operation of relay A by opening its contact 5 will disconnect ground from the tip conductor of jack JK.

4. The operation of relay A will connect ground through contact 4 of relay A and contact 3 of relay S which is unoperated, to the night alarm circuit.

5. The operation of relay A will close a circuit from battery through contact 6 of relay A, contact 4 of relay S and the filament of lamp L to ground, lighting the lamp as an indication that the distant subscriber is calling. If the switch, not shown, in the night alarm circuit is in the operate position the night alarm circuit will be sounded.

The circuit is now ready for the connection of an answering cord.

If the subscriber at the distant subscriber station restores the power switch 9 to its off or idle position and then reoperates it before the operator at the teletypewriter switchboard answers, the call relays SU and A, and the subscriber line lamp L at the switchboard will all follow the operation of the power switch.

If the subscriber at the distant subscriber station abandons the call by simply restoring the power switch 9 to its off or idle position before the operator at the switchboard answers, relays SU and A, the answering lamp and the night alarm will be cleared and the circuit, per Fig. 8, will be restored to the idle condition.

The operator at the teletypewriter switchboard answers an incoming call by inserting the plug of an answering cord in the line jack JK. The operation of the jack springs will perform three functions as follows:

1. The operation of the jack springs will connect the sleeve lead SL of the jack through the winding of relay S to ground. It will also operate relays in the connected cord circuit to set up a transmission path in the cord.

2. The operation of relay S by opening its contact 4 will extinguish subscriber line lamp L.

3. The operation of relay S, by closing its contact 1 and opening its contact 2, will transfer the transmission lead S from positive telegraph battery through resistor RA to positive telegraph battery of the same potential, through the ring lead R of the jack and the connected ring lead of the cord. The operator's teletypewriter set will be included in this path if the typing key of the cord circuit is operated. This path has been established by the operation of relays in the cord circuit when the sleeve lead of the cord circuit was connected as described under Function 1 of this section. Other circuit functions in the cord circuit prevent interference if two operators answer the same incoming call.

The operator may now operate the typing key in the cord circuit and communicate with the subscriber at the distant subscriber station. Keyboard operation of the operator's teletypewriter will open and close the path through conductor S which will cause alternate spacing and marking carrier current to flow in the line to the subscriber. The same operation will take place in the reverse direction from the subscriber to the operator.

The subscriber at the distant subscriber station may recall the operator after the operator's connection to the line jack has been made by restoring power switch 9 at the subscriber station to its off or normal idle position and then reoperating it.

The operation of the power switch to its off or normal idle position will interrupt the flow of current in conductor RS. This will release relays SU and A, leaving relay S operated, as it is assumed that the operator's cord circuit remains connected to jack JK. The tip lead of the cord circuit will be connected to ground through contact 5 of relay A. This causes a relay in the cord circuit to operate which lights the cord answering supervisory lamp, and prepares the cord for subsequent functions when ground is disconnected from the tip lead.

The reoperation of the power switch to its on position will cause current to flow again in conductor RS. This will reoperate relays SU and A. This will reconnect the ring conductor R of the cord circuit to the transmission lead S at contact 2 of relay A. It will also open the tip lead of the cord circuit by opening contact 5 of relay A. As a consequence of this the release of a relay in the cord circuit will connect interrupted ground to the cord lamp causing it to flash as a recall signal, to indicate that the distant subscriber is recalling the operator at the switchboard.

The switchboard operator may clear the flashing cord lamp and reply to the subscriber's recall signal by operating the typing key in the cord circuit. This will reconnect the operator's teletypewriter in the path of the ring lead of the cord circuit and the flashing of the cord circuit lamp will cease.

The switchboard operator may complete the call after securing the necessary information from the calling subscriber. This will be made clear hereinafter in the description of outgoing calls.

If the subscriber at the distant subscriber station wishes to disconnect, the power switch 9 at the subscriber station is actuated to its upper or off position. This interrupts the flow of current in conductor RS and releases relays SU and A. The release of these relays produces the same circuit action as the start of a recall signal described in the foregoing. Since the power switch in this case, however, is not reoperated the cord lamp will remain steadily lighted, the ring of the cord circuit will remain open, the tip of the cord circuit will remain grounded and conductor S to the carrier channel terminal will remain connected to positive telegraph battery through contact 1 of relay A.

The switchboard operator may ring or rering the subscriber, without disturbing the connection, by operating a ringing key in the cord circuit. The grounded tip of the cord circuit at contact 5 of relay A will permit circuit operations in the cord circuit which result in the application of ringing current to the ring lead R of the cord circuit. With relay S operated and relay A released, this ringing current will pass through contact 1 of relay S, contact 3 of relay A, winding of relay B and ringing condenser RC to ground. Relay B will be operated and released at the frequency of the ringing current. The operation of relay B will establish a circuit from ground through contact 1 of relay B, and the winding of relay C to battery, operating relay C. Relay C is a slow-to-release relay and remains operated throughout the ringing period. The operation of relay C, by opening its contact 1 and closing its contact 2, will transfer transmission conductor S from the ring of the cord circuit to the ringing circuit, which extends through the filament of ringing lamp RL to a source of ringing current. This, in turn, will cause the ringer at the subscriber station to operate.

The subscriber at the distant subscriber station will answer the ring or rering by operating the power switch 9 to its lower or operating position. This will restore the current in conductor RS in Fig. 8 and the circuit action will extinguish the cord lamp as an indication that the station attendant has answered.

After the subscriber has disconnected, the operator at the switchboard may disconnect by removing the plug of the answering cord from the line jack JK. The disconnection of the cord from jack JK will perform four functions as follows:

1. The disconnection of the cord will open the sleeve lead SL of the cord circuit.
2. The disconnection of the cord and the opening of the sleeve lead SL will release relay S.
3. The disconnection of the cord will open the tip lead T of the cord circuit.
4. The disconnection of the cord will open the ring lead of the cord circuit.

The release of relay S will perform two functions as follows:

1. The release of relay S will close the circuit from the subscriber line lamp L through contact 4 of relay S. This path, however, will be open at contact 6 of relay A.
2. The release of relay S by closing its contact 3 will connect the night alarm circuit to contact 4 of relay A which is open.

This restores the idle condition for both the circuit, per Fig. 8, and its cooperating cord circuit.

To originate an outgoing call or to complete an incoming call, the operator will insert the plug of her calling cord into the called subscriber line jack after making a busy test.

The operator may make a busy test of the subscriber line by touching the sleeve of the line jack with the tip of the calling cord plug. If the line is busy the sleeve of the line jack will be carrying negative potential from the sleeve of the connected cord. This potential, when applied to the tip of the subsequently connected cord circuit, will light a busy test lamp in the operator's busy test circuit.

When the switchboard operator establishes a connection to a called subscriber line, the plug of the calling cord is inserted in the called subscriber line jack. This performs three functions as follows:

1. The connection of the cord will connect the sleeve lead of the cord circuit through the winding of relay S to ground. This will operate relay S and will also operate relays in the cord circuit to prepare it for subsequent ringing operations.
2. The connection of the cord will connect the tip lead of the cord circuit to ground through back contact 5 of relay A.
3. The connection of the cord will connect the ring lead of the cord circuit through contact 1 of relay S and the direct-current path of the ring lead will be open at contact 2 of relay A. As seen from the carrier channel terminal conductor S will be terminated in positive 48-volt telegraph battery through contact 1 of relay A and resistor RA.

The operation of relay S will perform three functions as follows:

1. The operation of relay S will open the line lamp L conductor at contact 4 of relay S.
2. The operation of relay S will open the night alarm lead.
3. The operation of relay S will connect the ring lead R of the cord circuit to the winding of relay B through contact 1 of relay S, and contact 3 of relay A, and will remove positive battery through resistor RA from this lead by opening contact 2 of relay S.

The grounded tip lead of the cord circuit will permit the application of ringing current to the ring lead of the cord circuit when the ringing key in the operator's position circuit is operated. It will also light the calling cord lamp and hold the calling side of the cord circuit repeater closed.

The operator may now ring the distant subscriber by operating the ringing key in the operator's position circuit.

Operation of the ringing key will connect intervals of ringing current to the tip of the cord circuit and to the winding of relay B through back contact 3 of relay A. Relay B will be operated at ringing frequency through condenser RC to ground.

The operation of relay B will operate the slow-to-release relay C which will remain operated during a ringing interval.

The operation of relay C will connect ringing current to conductor S which extends into the carrier channel and, responsively, the ringer at the subscriber station will be operated.

In the cord circuit the operation of the ringing key will light and extinguish a ringing guard lamp in cycles such as, for instance, two seconds lighted and four seconds extinguished, per cycle.

The subscriber at the distant station will answer the ringing by operating the power switch 9 at the subscriber station to its lower or on position. This will cause current to flow in conductor RS of Fig. 8, and will operate relay SU as heretofore described. At the subscriber station the operation of the power switch will disconnect the ringing equipment which is normally connected to the line and connect the subscriber teletypewriter.

The operation of relay SU in Fig. 8 will operate relay A. The operation of relay A will perform three functions as follows:

1. The operation of relay A will disconnect the ring lead R of the cord circuit from the winding of relay B by opening contact 3 of relay A.
2. The operation of relay A will disconnect the tip lead of the cord circuit from ground by opening contact 5 of relay A.
3. The operation of relay A will connect the ring conductor R to transmission conductor S by closing contact 2 of relay A.

The removal of ground from the tip lead of the cord circuit by the opening of contact 5 of relay A will extinguish the ringing guard lamp and prepare the ring lead of the cord circuit for transmission. The two subscribers, or the operator and either subscriber, may now communicate by teletypewriter over the ring lead of the cord circuit.

The called subscriber may recall the operator by actuating the power switch 9 at the called subscriber station to its upper position and thereafter reoperating it to its lower position. The operation is the same as that described for recall by a calling subscriber in the foregoing, except that relays in the calling side of the cord are employed instead of relays in the answering side.

The called subscriber may transmit a disconnect signal to the teletypewriter switchboard by actuating power switch 9 at the called subscriber station to its upper position. This operation is the same as described for disconnect by a calling subscriber, except that apparatus in the calling side of the cord functions instead of apparatus in the answering side of the cord.

Transmission through the toll subscriber line circuit, per Fig. 8, is carried on over conductor S and the ring lead of the cord circuit with marking current which may, for instance, be 20 milliamperes and spacing current of 0, respectively.

The transmission of break signals through this circuit in either direction is performed by interrupting current in conductor S. The break signal is transmitted through the cord circuit repeater in the conventional manner.

Refer now to Fig. 9. Reference to Fig. 9 and a comparison of Fig. 9 and Fig. 8 shows that the two embodiments of the toll subscriber line circuit are identical, except that the tip and ring conductors T and R, respectively, in Fig. 9 are reversed with respect to those in Fig. 8. The tip and ring conductors of the cord which cooperates with Fig. 9 will, therefore, be reversed from that of the cord which cooperates with Fig. 8. The detailed operation of the two circuits is otherwise substantially identical to that of Fig. 9 and may be understood from the foregoing detailed description of Fig. 8.

Figure 10:
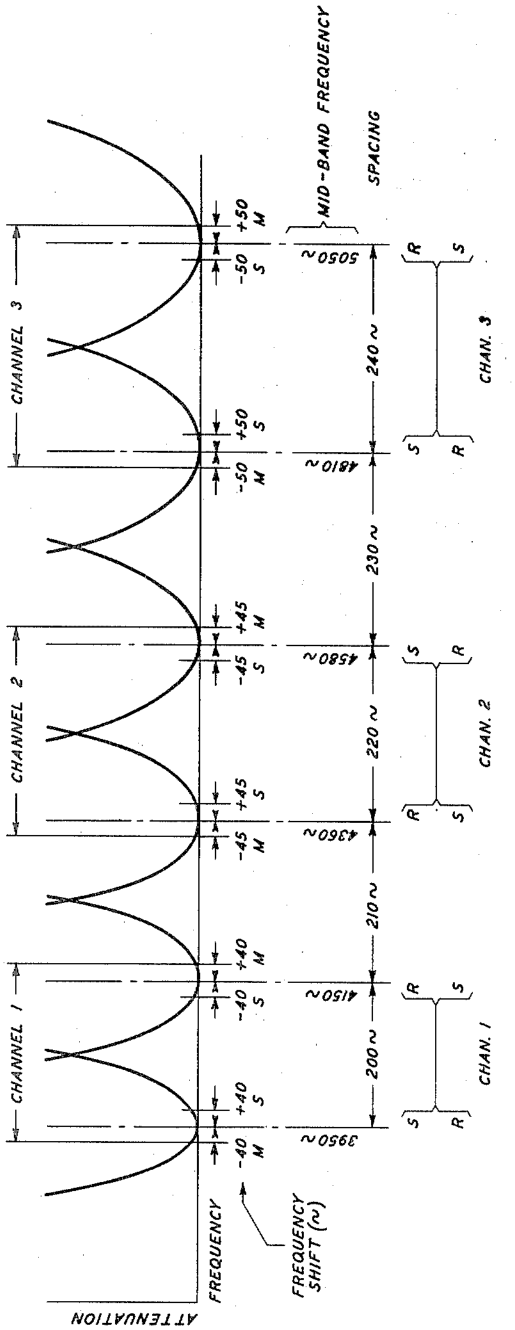
Fig. 10 shows one arrangement of frequency allocation, known as the interleaved frequency allocation arrangement, for three two-way circuits.

Refer now to Fig. 10 which shows one arrangement of frequency allocations, which applicants name the interleaved frequency allocation arrangement, applied to three two-way circuits.

A carrier telegraph system always operates on a four-wire circuit or its electrical equivalent to prevent interference between the transmitting and receiving portions of the carrier terminal. When the connection between terminals is over a single pair, the essential "four-wire" condition is realized by employing different frequencies for the two directions of transmission. Adjacent mid-band frequencies are assigned to each of the three channels as shown to the left of label Mid Band Freq in Fig. 10. The mid-band frequencies chosen for purposes of illustration are as indicated on the drawing 3950 cycles, 4150 cycles, 4360 cycles, 4580 cycles, 4810 cycles and 5050 cycles. Owing to the fact that the discrimination of band-pass filters decreases with increasing mid-band frequency for a given percentage accuracy of coil constants, the spacing between channel centers has been increased as indicated on the drawing from a minimum of 200 cycles to a maximum of 240 cycles. Mid-band frequencies of 3950 and 4150 cycles are assigned to the opposite directions of transmission for channel 1. Frequencies 4360 and 4580 are assigned to channel 2 and frequencies 4810 and 5050 to channel 3. The frequency shift between the marking and spacing signals in each channel is correspondingly increased from a difference of 80 cycles in channel 1 to a difference of 90 cycles in channel 2 and a difference of 100 cycles in channel 3.

Reference to Fig. 10 shows that the mid-band frequency in transmitting in a first direction, say from west to east over channel 1 is 3950 cycles and in transmitting in a second direction say from east to west over channel 1 is 4150 cycles. It is of course to be understood that the mid-band frequencies are passed through only momentarily in a single transition between the marking and spacing signal and vice versa without phase discontinuity. The particular marking signal frequency for each direction of transmission is normally being transmitted from each terminal and the spacing signal is produced by shifting 80, 90 and 100 cycles from the marking signal frequency indicated for channels 1, 2 and 3, respectively.

Reference to channel 1 in Fig. 10 indicates that the marking frequency for transmission from west to east is 40 cycles less than the mid-band frequency of 3950 cycles which would be 3910 cycles and the spacing frequency is 40 cycles more than the mid-band frequency or 3990 cycles. For transmision in the opposite direction the mid-band frequency is 4150 cycles. The marking frequency, instead of being 40 cycles less however, in this case is 40 cycles more or 4190 cycles and the spacing frequency is 40 cycles less than the mid-band frequency or 4110 cycles. As a result of this frequency selection it is apparent that in channel 1 the two marking frequencies, which are impressed on the line during periods of no signaling as well as during the transmission of marking signals, have a frequency separation of 4190 minus 3910 or 280 cycles, which is equal to the 200-cycle normal separation of the mid-band frequencies, plus the 80-cycle frequency shift. Similarly the marking signal frequencies of channel 2 are separated by the difference between their mid-band frequencies and the shift, which for channel 2 is 220 cycles plus 90 cycles or 310 cycles. For channel 3 it is 240 cycles plus 100 cycles or 340 cycles. The difference between the outgoing high level marking signal carrier and the incoming low level marking signals for channels 1, 2 and 3, therefore, is 280, 310 and 340 cycles, respectively. For incoming spacing signals the difference from the outgoing high level marking signals is 200, 220 and 240 cycles, respectively, for each direction which is the same as the mid-band frequency separation.

In addition to the foregoing advantage of relatively wide frequency separations between the high level outgoing marking signals and the low level incoming signals at the channel terminals, there is another important advantage obtainable through the use of the interleaved frequency arrangement. Reference to Fig. 1 indicates a carrier chanel joined to the line at an intermediate point of the line. As such a point it would be necessary to filter out two bands, one for transmitting from the intermediate point toward say the east terminal and the other for transmitting from the east terminal to the channel which is joined at the intermediate point. With the interleaved frequency arrangement, as distinguished from the grouped frequency arrangement to be described hereinafter, it is possible to assign two adjacent bands for transmission to and from the channel joined at the intermediate point. The two adjacent bands may be separated with one filter. With the grouped frequency arrangement, wherein the sending frequencies from say the west lie adjacent and those from the east lie adjacent, it is not possible to employ a single filter. Two filters are required except for one condition to be described hereinafter. The interleaved arrangement, therefore, affords a saving in filters for intermediate connections.

There is yet another advantage obtainable when adjacent mid-band frequencies may be employed for sending and receiving. Attention has been called to the fact that the higher the frequency the greater the attenuation. It is desirable that the length of loop which may be utilized should not be too limited by the greater attenuation of the higher band frequency of two widely differing band frequencies selected for transmission in opposite directions over one circuit. The interleaved frequency arrangement and the single filter required for passing two adjacent bands, one for sending and one for receiving, affords, for less expenditure, the advantage available in a wider selection of closely spaced band frequencies and their more uniform attenuation. This makes it possible to serve more intermediately connected circuits of greater lengths with fewer filters.

Figure 11:
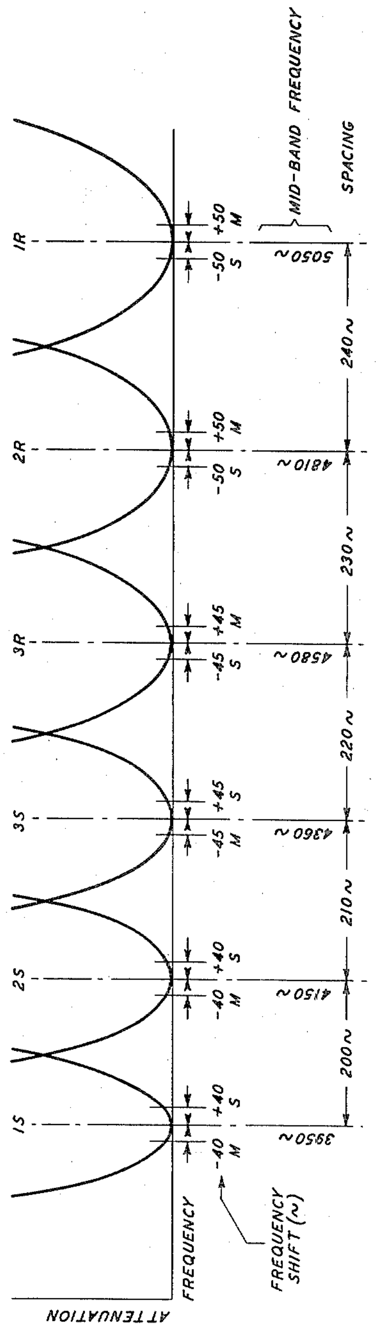
Fig. 11 shows a second arrangement of frequency allocation, known as the grouped frequency allocation arrangement for three two-way circuits.

Refer now to Fig. 11 which shows the grouped arrangement of frequency allocation. In this arrangement the mid-band frequency of six adjacent bands, shown by way of example, are the same as in the interleaved arrangement. In this arrangement, however, the three lower frequency bands are assigned for instance for transmission from the west terminal and the three higher for transmission from the east terminal. The amounts of the frequency shifts for each channel are the same as in the interleaved arrangement. In the grouped arrangement, except for the third and fourth bands, the differences between each outgoing high level marking frequency and the incoming marking and spacing signal frequencies to the same circuit are greater than in the interleaved arrangement. The grouped arrangement, therefore, affords the advantage of a wider separation between the frequencies of the high level outgoing marking signal and the incoming relatively low level signals. By selecting the middle two bands, such as the third and fourth bands of a group of six, for dropping off at an intermediate point, it is possible to employ a single filter for both. However, since the employment of a single filter is limited to a single pair of bands, instead of to every adjacent pair, as in the interleaved arrangement, it is not possible to so economically care for as many long intermediately connected circuits with the grouped arrangement as with the interleaved ararngement.

Attention is called to the fact that in the case of the grouped frequency arrangement for the three lower bands of the group of six, described by way of example, the marking frequency is the lower of the marking and spacing frequencies and for the three higher the marking frequency is the higher of the marking and spacing frequencies. This is of greatest importance in the case of the middle two bands which may be selected for separation at an intermdiate point to serve say a loop connected thereat. The frequency arrangement for these two bands is the same as in the interleaved arrangement and for this one circuit the advantages cited in the foregoing for the interleaved frequency arrangement are available, namely, the widest feasible separation between the relatively high level transmitted marking signals and the low level received signals at each terminal and the smaller restriction of loop length due to diversity of attenuation since the mid-band frequencies of the two selected bands are adjacent.

It is to be understood that the frequencies mentioned are by way of example only. The frequencies which may be employed cover a very wide range without theoretical limitation from zero cycles to ultra-high frequencies and the member of channels which may be utilized is similarly without restriction.

Refer now to Fig. 6. There is one other feature of the invention to which attention is now directed. Nearly all of the voltage gain of the receiving branch in the lower portion of Fig. 6 appears ahead of the detectors 64, 65. Since the detector output voltage applied to the grids of the beam power tetrodes V53 and V54 is high enough to give an approximately square signal wave shape in the connected subscriber loop, no intermediate stage of direct-current amplification is needed following the detector. For unbiased signal reception, the demodulated signals should be centered on the grid characteristics of the receiving tubes, that is, with the circuit configuration here used, the marking and spacing voltages applied to the grid circuit should be symmetrical about a potential approximately 5 volts negative with respect to the cathodes of receiving tubes V53 and V54. To obviate the need for a voltage source negative with respect to the cathodes, the signals are prebiased by unbalancing the detector so that the mean of the mark and space output voltages from the low pass filter is negative 5 volts. This is the function of resistor R90 shown in Fig. 6. Further adjustment of the mean signal value may be made by means of the receive bias potentiometer Rec Bias to compensate for bias of signals received from the line due to deviations in the mark and space frequencies from their theoretical values or to other causes originating at the sending terminal of the telegraph circuit as well as to bias due to discrepancies in the discrimination network or to differences between mark and space levels.

These arrangements permit great freedom in the assignment of loop battery voltages. The cathodes of the final stage may be fixed at negative 130 volts, negative 48 volts or ground potential, for instance, and the plates operated from ground, positive 48 volts or positive 130-volt potential, respectively.

What is claimed is:

1. A teletypewriter switching system having a central teletypewriter switching station, a subscriber teletypewriter station remote from said switching station, a direct-current toll subscriber telegraph line circuit at said central station, a direct-current subscriber teletypewriter station circuit, having a direct-current telegraph transmitter and a direct-current telegraph receiver therein, at said subscriber station, an individual alternating-current transmitting branch and an individual alternating-current receiving branch connected individually to said direct-current circuits at each of said stations, an alternating-current path extending from said branches at said switching station to said branches at said subscriber station, a first means in said circuits, responsive to a first condition of said transmitter, for transmitting alternating-current signal elements of a first frequency between said stations as telegraph marking signal elements, a second means in said circuits, responsive to a second condition of said transmitter, for transmitting alternating-current signal elements of a second frequency between said stations as telegraph spacing signal elements, said direct current toll subscriber telegraph line circuit having a first communication signal conductor for transmitting and receiving direct-current marking and spacing signal elements to and from said alternating-current transmitting branch and said alternating-current receiving branch at said central station, respectively, and a second conductor in said toll subscriber line circuit, for receiving direct-current supervisory signals from said receiving branch at said central station, a supervisory signal control in said subscriber station circuit, a subscriber's line calling signal at said central switching station, and means connected to said second conductor, responsive to the interruption of carrier by said signal control, for operating said line calling signal at said central switching station.

2. A system in accordance with claim 1 having means of transition between the transmission of signal elements of said first and of said second frequency at a predetermined signaling frequency as another signaling condition between said stations, said means comprising a ringing circuit and a ringing control therefor, both in said toll subscriber telegraph line circuit, said control responsive to a condition imposed on said first conductor at said central station.

3. A system in accordance with claim 1, having means for extending said supervisory path through a flexible connection to a cord circuit to control a supervisory signal in said cord.

4. A system in accordance with claim 1 having means for connecting a cord circuit to said toll circuit and means for impressing a first and a second supervisory signal condition on said connecting means.

5. A teletypewriter switching system, said system having a manual teletypewriter switchboard, said switchboard having a telegraph switchboard operator's cord circuit therein, said cord circuit having means for flexibly interconnecting direct-current toll subscriber telegraph line terminating circuits connected to said board to other circuits, a direct-current toll subscriber telegraph, line terminating circuit and a first carrier circuit, at said switchboard, a telegraph line, a teletypewriter subscriber station, a subscriber station circuit and a second carrier circuit at said station, a telegraph path connecting said switchboard to said station extending in sequence through said cord circuit, said terminating circuit, said first carrier circuit, said line, said second carrier circuit and said station circuit, means in said carrier circuits responsive to control means in either said terminating circuit or said station circuit for transmitting carrier shift signals over said line as marking and spacing telegraph communication signals, means in either of said carrier circuits responsive to control means in said terminating circuit or said station circuit for transmitting a line calling signal over said line, means in said circuits, responsive to a control in said station circuit, for transmitting a disconnect signal to said switchboard, means in said circuits, responsive to a control in said station circuit, for transmitting a recall signal to said switchboard and means in said circuit, responsive to a condition impressed through said cord circuit on said toll subscriber telegraph line terminating circuit, for transmitting a reringing signal to said subscriber station.

6. A telegraph system having a first telegraph path operatively interconnecting a first group of direct-current subscriber telegraph circuits through individual frequency shift telegraph circuits therefor, at a first telegraph terminal, through a second group of frequency shift telegraph circuits, at a second telegraph terminal, remote from said first terminal, to individual subscriber toll line telegraph circuits, a second telegraph path connected to an intermediate point on said first path, alternating-current generating means connected to said first path for transmitting over a portion of said first path alternating currents of eight or more different frequencies, a single filter connected in said second path for selectively passing four adjacent frequencies of said eight or more frequencies, an alternating-current circuit connected to said second path having a transmitting branch with means for transmitting a first adjacent two of said four frequencies and a receiving branch including means for receiving a second adjacent two of said four frequencies.

7. A telegraph system having a first telegraph path operatively interconnecting a first multistation frequency shift telegraph terminal to a second multistation frequency shift telegraph terminal, a second telegraph path connected to an intermediate point on said first path, alternating-current generating means connected to said first path for transmitting over a portion of said first path alternating currents of twelve different frequencies, a single filter connected in said second path for selecting the four middle frequencies of said twelve, a transmitting branch connected to said second path for transmitting a first adjacent two of said four frequencies and a receiving branch connected to said second path for receiving a second adjacent two of said four frequencies.

8. A frequency shift telegraph system having a first telegraph station, a second telegraph station, a telegraph signal path interconnecting said stations, means at said first station for transmitting an alternating current of a first frequency over said path as a marking signal condition, means at said first station for transmitting an alternating current of a second frequency, higher than said first frequency, over said path as a spacing signal condition, means at said second station for transmitting an alternating current of a third frequency higher than said second frequency, over said path as a spacing signal condition, means at said second station for transmitting an alternating current of a fourth frequency, higher than said third frequency, over said path as a marking signal condition, and means at said first station for transmitting alternating current of said first frequency while alternating current of said third or said fourth frequency is incoming to said first station.

9. A frequency shift telegraph system having, a telegraph path, a first and a second telegraph station connected to a first end of said path, a third and a fourth telegraph station connected to a second end of said path, means connected to said path for generating alternating currents of a first, second, third, fourth, fifth, sixth, seventh and eighth frequency of increasing numerical magnitude in numerical sequence, means at said first and said second stations, respectively for impressing on said path said currents of said first and said eighth frequencies respectively as marking signal conditions, means at said first and said second stations respectively for impressing on said path said currents of said second and said seventh frequencies respectively as spacing signal conditions, means at said third and said fourth stations respectively for impressing on said path said currents of said fourth and said fifth frequencies respectively as marking signal conditions, means at said third and said fourth stations respectively for impressing on said path said currents of said third and said sixth frequencies respectively as spacing signal conditions, means at said first, second, third and fourth stations respectively for selectively receiving currents of said third and fourth, said fifth and sixth, said first and second and said seventh and eighth frequencies respectively and means at each of said stations for transmitting its respective marking current frequency while receiving.

10. A frequency shift telegraph system having a first, second, third, fourth, fifth and sixth telegraph station, a first, second and third telegraph terminal, a first telegraph path interconnecting said first and second terminal, a second telegraph path interconnecting said third terminal to said first path at a point intermediate said first and said second terminal, said first and second station connected directly to said first terminal, said third, fourth and fifth stations connected directly to said second terminal, said sixth station connected directed to said third terminal, alternating-current transmitting and receiving circuit branches at said first, second and sixth stations respectively for transmitting to and receiving from said third, fourth and fifth stations respectively, alternating-current transmitting and receiving circuit branches at said third, fourth and fifth stations respectively for transmitting to and receiving from said first, second and sixth stations respectively, said transmitting branch at each of said stations comprising an individual alternating-current generator means and an individual alternating-current frequency shift means for producing alternating currents of two different frequencies at each of said stations and a total of twelve different frequencies at said six stations, said frequencies numbered one to twelve in the order of the numerical increase of their frequency, means in said generator and frequency shift means at stations one to four respectively for producing currents of two adjacent frequencies, namely frequencies one and two, nine and ten, three and four and eleven and twelve, respectively, means in said generator and said frequency shift means at each of stations five and six for producing currents of two frequencies each of four adjacent frequencies, namely, currents of frequencies five and six, and seven and eight, and a single filter in said second path for selecting currents of said four adjacent frequencies.

References Cited in the file of this patent

UNITED STATES PATENTS

| | | |
|---|---|---|
| 1,722,274 | Clark et al. | July 30, 1929 |
| 1,804,548 | Vernam | May 12, 1931 |
| 2,024,581 | Kinkead et al. | Dec. 17, 1935 |
| 2,093,084 | Krecek | Sept. 14, 1937 |
| 2,198,901 | Boswau | Apr. 30, 1940 |
| 2,353,499 | Purington | July 11, 1944 |
| 2,455,617 | Shepard | Dec. 7, 1948 |
| 2,455,724 | Bacon | Dec. 7, 1948 |
| 2,490,666 | Blyholder | Dec. 6, 1949 |
| 2,495,773 | Roberts | Jan. 31, 1950 |
| 2,503,000 | Shanck | Apr. 4, 1950 |
| 2,552,362 | Adams | May 8, 1951 |
| 2,573,392 | Boughtwood et al. | Oct. 30, 1951 |
| 2,606,251 | Oberman | Aug. 5, 1952 |
| 2,611,031 | Appert | Sept. 16, 1952 |
| 2,623,123 | Motte | Dec. 23, 1952 |
| 2,644,036 | Jones | Dec. 23, 1952 |
| 2,667,536 | Gardiner et al. | Jan. 26, 1954 |
| 2,677,014 | Moynihan | Apr. 27, 1954 |